E. E. McMILLAN.
WEB MEASURING DEVICE.
APPLICATION FILED DEC. 13, 1918.

1,323,402.

Patented Dec. 2, 1919.
2 SHEETS—SHEET 1.

INVENTOR
Edward E. McMillan
BY
Horace Freeman
his ATTORNEY

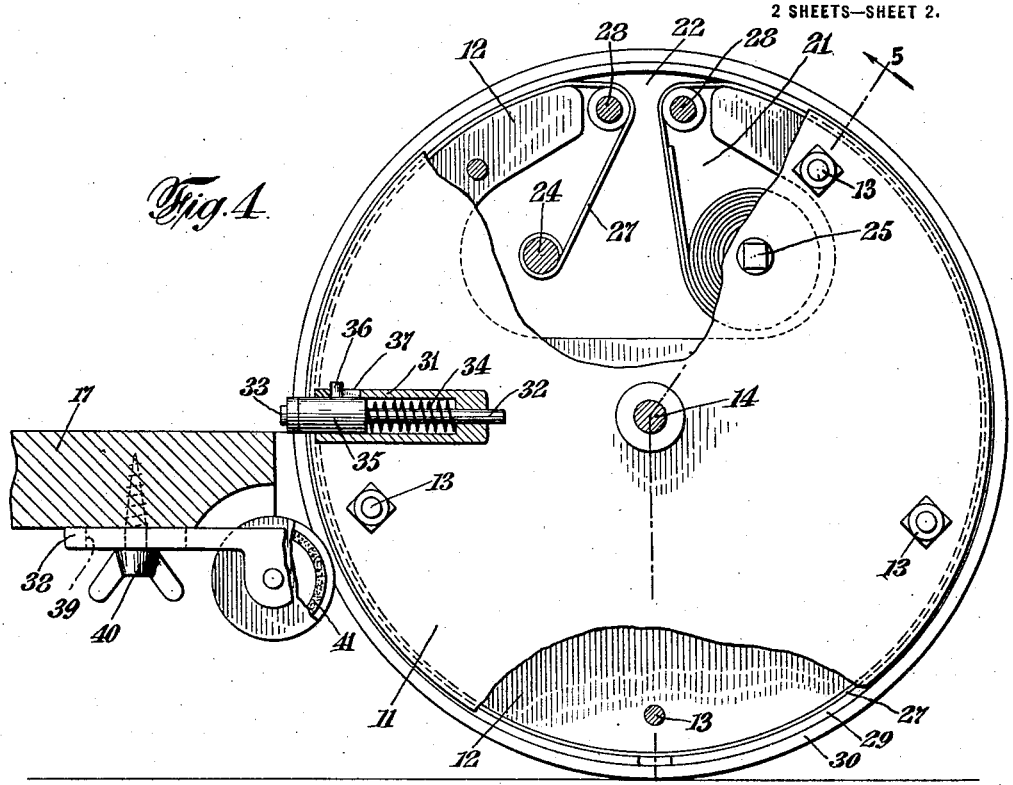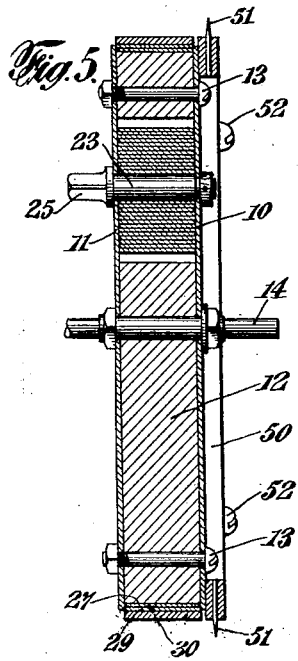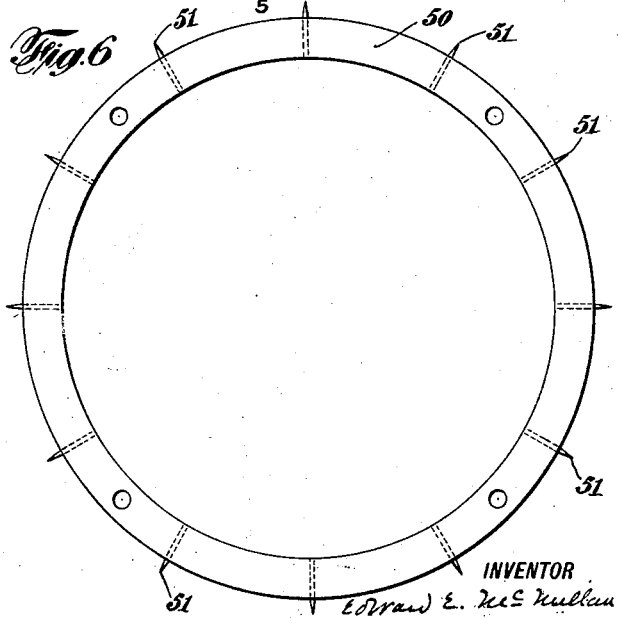

UNITED STATES PATENT OFFICE.

EDWARD E. McMILLAN, OF JERSEY CITY, NEW JERSEY.

WEB-MEASURING DEVICE.

1,323,402.   Specification of Letters Patent.   Patented Dec. 2, 1919.

Application filed December 13, 1918. Serial No. 266,557.

*To all whom it may concern:*

Be it known that I, EDWARD E. McMILLAN, a citizen of the United States, residing in Jersey City, county of Hudson, and State of New Jersey, have invented certain new and useful Improvements in Web-Measuring Devices, of which the following is a full, clear, and exact specification.

My invention relates to web measuring devices and refers particularly to devices for the accurate measurement of webs which become stretched when submitted to tension.

One object of my invention is a device whereby the length of fabrics may be accurately measured.

Another object of my invention is a device whereby a fabric under tension may be so measured as to give the actual length when the tension is removed.

Another object of my invention is a device capable of being adapted to the measurement of fabrics under different tensions.

Another object of my invention is a device capable of marking a fabric under tension to give a predetermined length of fabric when the tension is removed.

Another object of my invention is a device suitable for the rapid testing of the length of fabric being measured by another device in order to prove the accuracy of the last mentioned measuring device.

These and other objects of my invention will be evident upon a consideration of my specification and drawings.

Numerous devices are employed for the measurement of fabrics in the form of webs in rolls or bolts. This is usually accomplished by unrolling the fabric web from the bolt and measuring the length of fabric thus unrolled.

As considerable tension is necessary in this process, it is evident that the amount thus measured will not be an accurate measurement of the fabric web when it is in its natural condition and the tension removed. Fabrics of different material and weave vary very considerably in their action under tension as some of them stretch much more than others, thus causing a difference in the length of the fiber webs between their length under tension and that when the tension is removed.

As fabric webs are usually found in the market in the form of rolls and bolts, it is highly advantageous that some means be found whereby the length of the fabric as indicated during its unrolling under tension be expressed in terms of its actual length when in its natural unstretched condition.

The device of my invention overcomes the difficulties incident to the measurement of a web under tension and allows the measurement thus taken to be expressed in terms of the length of the web without tension.

My device can be readily regulated to give an accurate measurement of released fabrics when measured under any particular tension, thus making it of general application for the purposes for which it is intended.

My device consists in a broad way of an expansible revoluble wheel capable of marking the fabric at predetermined distances from each other and of registering the number of such markings, the register numbers not designating the length of the web under the tension at which it is measured, but the length of the web in its natural condition after the tension is removed.

In the accompanying drawings, forming a part of this application and illustrating one form of the device of my invention, with a modification, similar parts are designated by similar numerals:—

Fig. 4 is a section through the line 4—4 of Fig. 2, partly broken away.

Fig. 5 is a section through the line 5—5 of Fig. 4, modified by the addition of a pin-holding ring.

Fig. 6 is a plan view of the pin-holding ring shown in Fig. 5.

Figure 1:
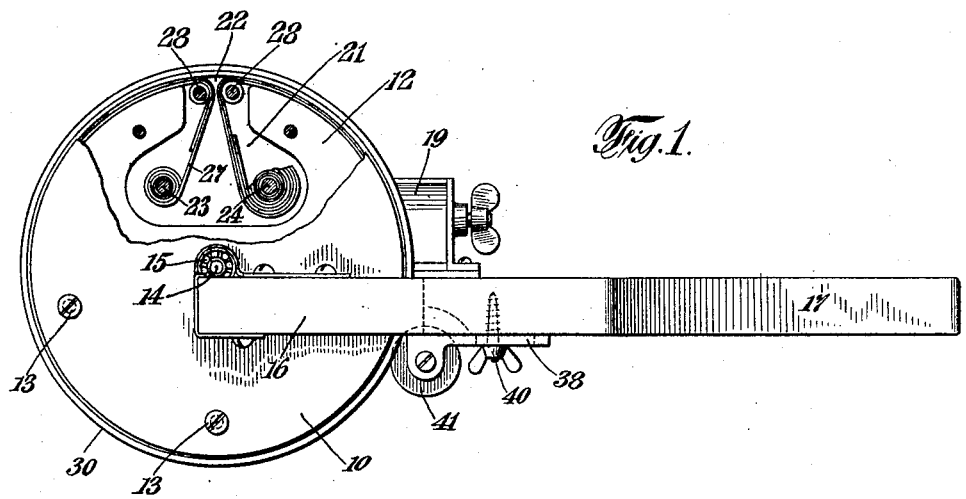
Figure 1 is a side plan view partly broken away.
Figure 2:
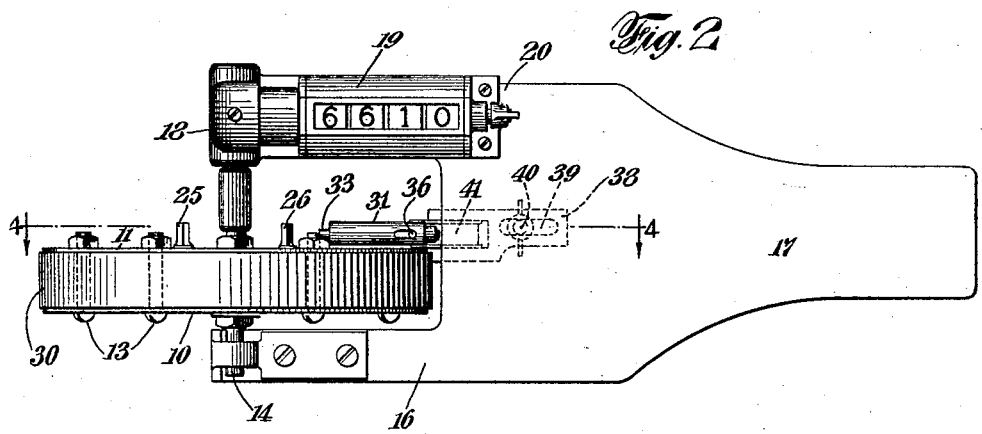
Fig. 2 is a top plan view.

The particular form of the device of my invention illustrated in the accompanying drawings, comprises a revoluble wheel formed by two circular plates 10 and 11, connected to the body 12 by means of the screws 13, 13, 13. The body 12 is fixedly attached to the axle 14, revoluble within the ball-bearings 15 supported by the arm 16 of the handle 17. The other end of the axle 14 is extended outwardly and is connected at 18 with an ordinary registering device 19, which registers the number of revolutions of the axle 14, the axle 14 and the register 19 being supported by the arm 20 of the handle 17.

Figure 3:
Fig. 3 is a broken side view of the belt of the device.

The body 12 contains a recess 21 with the opening 22. Within the recess 21 are two revoluble shafts 23 and 24, revoluble within the plates 10 and 11. The shaft 23 has an extended nut 25, and the shaft 24 has an extended nut 26, whereby either shaft may be revolved by means of a key. The two extremities of a belt 27 are attached to the shafts 23 and 24 and passes over the idlers 28, 28. The belt 27 is composed of a series of adhering layers as shown particularly in Fig. 3. That portion comprising one layer is preferably of such a length as to extend from shaft 23 around the circumference of the wheel to the shaft 24, a similar length is composed of two layers, a similar length of three layers, this increase of layers being continued to meet the requirements of the device as explained later.

Situated around the wheel and abutting upon the belt 27 is a split resilient ring-shaped member 29. The resilient member 29 is maintained in close abutment upon the belt 27 by means of the tightly fitting flat rubber band 30.

Carried by the plate 11 is a marker comprising a casing 31 within which is a slidable member 32, carrying a marking device 33, as a rubber point or letter, a spring 34 abutting upon the portion 35 of the slidable member 32 and the end of the casing 31 has a tendency to push the marking device 33 outwardly, this movement being controlled by the pin 36 of the member 35 movable within the slot 37 of the casing 31.

The handle 17 carries a movable Y-shaped plate 38, having a slot 39, through which the flanged screw 40 acts to retain the plate 38 in a desired position. Revoluble between the arms of the plate 38 is an inking wheel 41. The screw 40 allows the inking wheel 41 to be so situated that the marking device 33 will abut thereon and revolve it during the revolution of the wheel, thus inking the marking device at each revolution.

In the modification shown in Figs. 5 and 6, the device, as described above, has attached to it a ring 50, carrying a series of extended points or pins 51, 51, by means of the screws 52, 52 for purposes described later.

For purposes of ease of operation the circumferential measurement of the wheel when in its normal condition with the single belt around its circumference is exactly eighteen inches, the recorder 19 thus registering one numeral for each complete revolution of the wheel, and hence, if the wheel be revolved over a surface for two revolutions, the distance thus traveled will be exactly thirty-six inches, or, one yard, and the register will register the number two. If the circumference of the wheel should be increased to nineteen inches, the distance thus traveled will be thirty-eight inches, but the register will still register the numeral two.

The operation of the device is as follows:—

The wheel of the device is placed in contact with the roll of cloth to be measured and the cloth withdrawn, the withdrawal of the cloth under tension revolving the wheel, the marker 33 leaving impressions upon the cloth. The distance between two consecutive markings is carefully measured. If these markings upon the cloth when it is removed from tension measure less than eighteen inches, for example seventeen and one-half inches, the nut 26 of the shaft 24, shown in Fig. 4 is revolved to the right, thus winding the belt around the shaft 24 and from the shaft 23. This movement gradually withdraws the single belt from around the circumference of the wheel and gradually replaces it with two-ply belt, thus forcing outwardly the resilient member 29 and the rubber band 30 and increasing the circumferential measurement of the wheel. This operation is continued until one revolution of the wheel measures a distance of about eighteen and one-half inches upon cloth not under tension. The wheel is then applied to the cloth being unrolled and the markings on the normal cloth again measured. If this distance now measures eighteen inches on the cloth not under tension, it is evident that each revolution of the wheel upon the cloth under tension will measure eighteen inches of the cloth when the tension is removed, and the register will register the number of eighteen inch length being unrolled. If necessary, further changes are made in the circumference of the wheel to actually measure eighteen inches of cloth without tension, when applied to the cloth under tension. In the example given the numerals registered on the register multiplied by two will give the number of yards of cloth on the roll in its natural condition, although the measurement has been made upon cloth under tension.

It is evident that the device may be attached to the unrolling machine by any suitable means whereby it abuts upon the roll, or it can be employed upon the slack cloth between the winding and unwinding rolls, in which case it is preferable that the modification shown in Figs. 5 and 6 be employed, the pins 51, 51 entering the cloth and preventing it from passing the wheel of the device without revolving it.

The ink markings, while not always necessary of employment, can be used as a means for proving the accuracy of the device.

I do not limit myself to the particular size, shape, number or arrangement of parts, described and shown, all of which may be varied without going beyond the scope of my invention as described and claimed.

What I claim is:—

1. In a device of the character specified, in combination, a revoluble wheel, a belt of varying thickness from end to end encircling the wheel and having a length greater than the circumference of the wheel the surplus length being held within the wheel, means for moving the belt progressively around the perimeter of the wheel, means for maintaining the belt in a predetermined position around the perimeter of the wheel and means for registering the number of revolutions of the wheel.

2. In a device of the character specified, in combination, a revoluble wheel, a belt of varying thickness from end to end encircling the wheel and having a length greater than the circumference of the wheel the surplus length being held within the wheel, means for moving the belt over the face of the wheel, an elastic member abutting upon the belt and maintaining it in position and means for registering the number of revolutions of the wheel.

3. In a device of the character specified, in combination, a revoluble wheel having a recess within the wheel, two revoluble spools within the recesss, a belt of varying thickness from end to end encircling the wheel and having a length greater than the circumference of the wheel the surplus length being held within the wheel, the two ends of the belt being attached respectively to the spools, means for revolving the spools to move the belt in either direction and means for registering the number of revolutions of the wheel.

4. In a device of the character specified, in combination, a revoluble wheel having a recess within the wheel, two revoluble spools within the recess, a belt of varying thickness from end to end encircling the wheel and having a length greater than the circumference of the wheel the surplus length being held within the wheel, the two ends of the belt being attached respectively to the spools, means for revolving the spools to move the belt in either direction, a split resilient band circumscribing the wheel and abutting upon the outer face of the belt and means for registering the number of revolutions of the wheel.

5. In a device of the character specified, in combination, a revoluble wheel having a recess within the wheel, two revoluble spools within the recess, a belt of varying thickness from end to end encircling the wheel and having a length greater than the circumference of the wheel the surplus length being held within the wheel, the two ends of the belt being attached respectively to the spools, means for revolving the spools to move the belt in either direction, a split resilient band circumscribing the wheel and abutting upon the outer face of the belt, an elastic band encompassing the resilient band and maintaining it in place and means for registering the number of revolutions of the wheel.

6. In a device of the character specified, in combination, a revoluble wheel, a belt of varying thickness from end to end encircling the wheel and having a length greater than the circumference of the wheel the surplus length being held within the wheel, means for moving the belt around the perimeter of the wheel, means for maintaining the belt in a predetermined position around the perimeter of the wheel, means for preventing the slipping of a moving fabric upon which the wheel is revolving and means for registering the number of revolutions of the wheel.

7. In a device of the character specified, in combination, a revoluble wheel having a recess within the wheel, two revoluble spools within the recess, a belt of varying thickness from end to end encircling the wheel and having a length greater than the circumference of the wheel the surplus length being held within the wheel, the two ends of the belt being attached respectively to the spools, means for revolving the spools to move the belt in either direction, a series of outwardly extended points around the perimeter of the wheel and means for registering the number of revolutions of the wheel.

8. In a device of the character specified, in combination, a revoluble wheel having a recess within the wheel, two revoluble spools within the recess, a belt of varying thickness from end to end encircling the wheel and having a length greater than the circumference of the wheel the surplus length being held within the wheel, the two ends of the belt being attached respectively to the spools, means for revolving the spools to move the belt in either direction, a split resilient band circumscribing the wheel and abutting upon the outer face of the belt, an elastic band encompassing the resilient band and maintaining it in place, a series of outwardly extended points around the perimeter of the wheel and means for registering the number of revolutions of the wheel.

9. In a device of the character specified, in combination, an expansible revoluble wheel having a circular circumferential face, means for gradually increasing the circumference of the wheel, a belt of varying thickness from end to end encircling the wheel and having a length greater than the circumference of the wheel the surplus length being held within the wheel and means for registering the number of revolutions of the wheel irrespective of its circumference.

10. In a device of the character specified, in combination, an expansible revoluble wheel having a circular circumferential face, means for gradually increasing the circumference of the wheel maintaining a substantially circular circumferential face, a belt of varying thickness from end to end encircling the wheel and having a length greater than the circumference of the wheel the surplus length being held within the wheel and means for registering the number of revolutions of the wheel irrespective of its circumference.

Signed at New York in the county of New York and State of New York this 12th day of December, 1918.

EDWARD E. McMILLAN.